March 18, 1958 G. C. LENTS 2,827,558
ILLUMINATED GRADUATED LEVEL
Filed Dec. 10, 1954 3 Sheets-Sheet 1
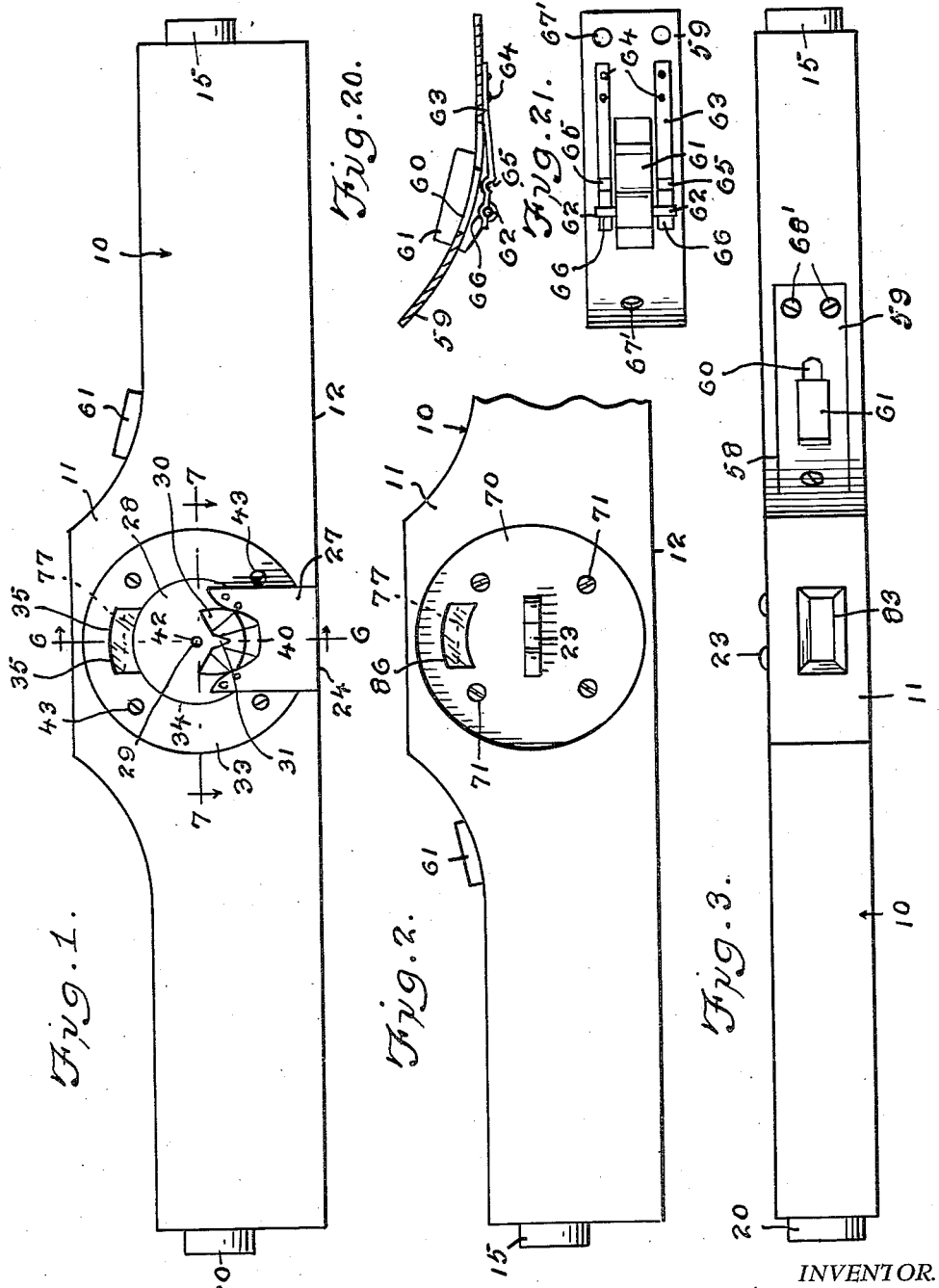
INVENTOR.
George C. Lents March 18, 1958  G. C. LENTS  2,827,558
ILLUMINATED GRADUATED LEVEL
Filed Dec. 10, 1954  3 Sheets-Sheet 2
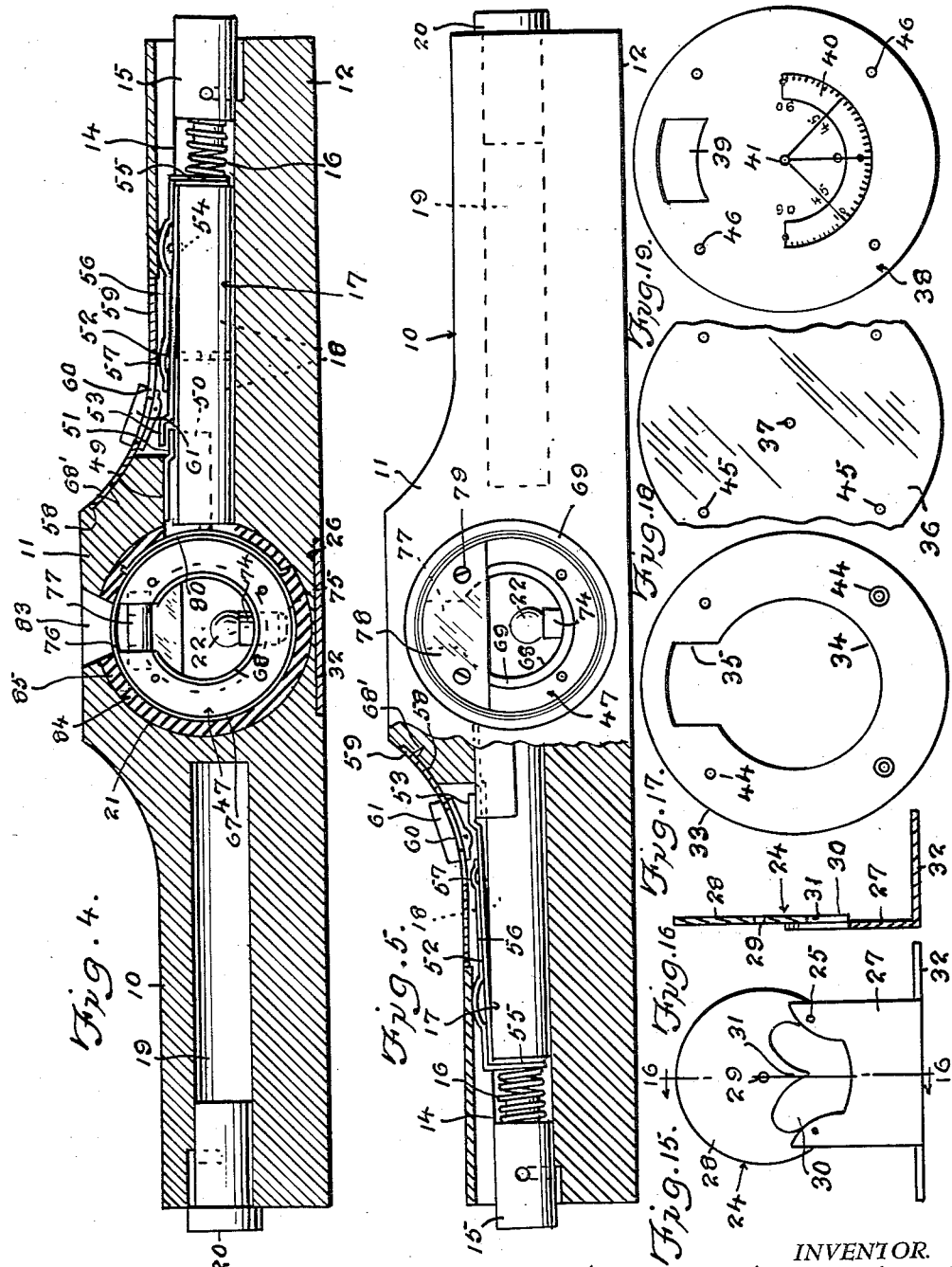
INVENTOR.
George C. Lents
BY Victor J. Evans & Co.
ATTORNEYS March 18, 1958  G. C. LENTS  2,827,558
ILLUMINATED GRADUATED LEVEL
Filed Dec. 10, 1954  3 Sheets-Sheet 3
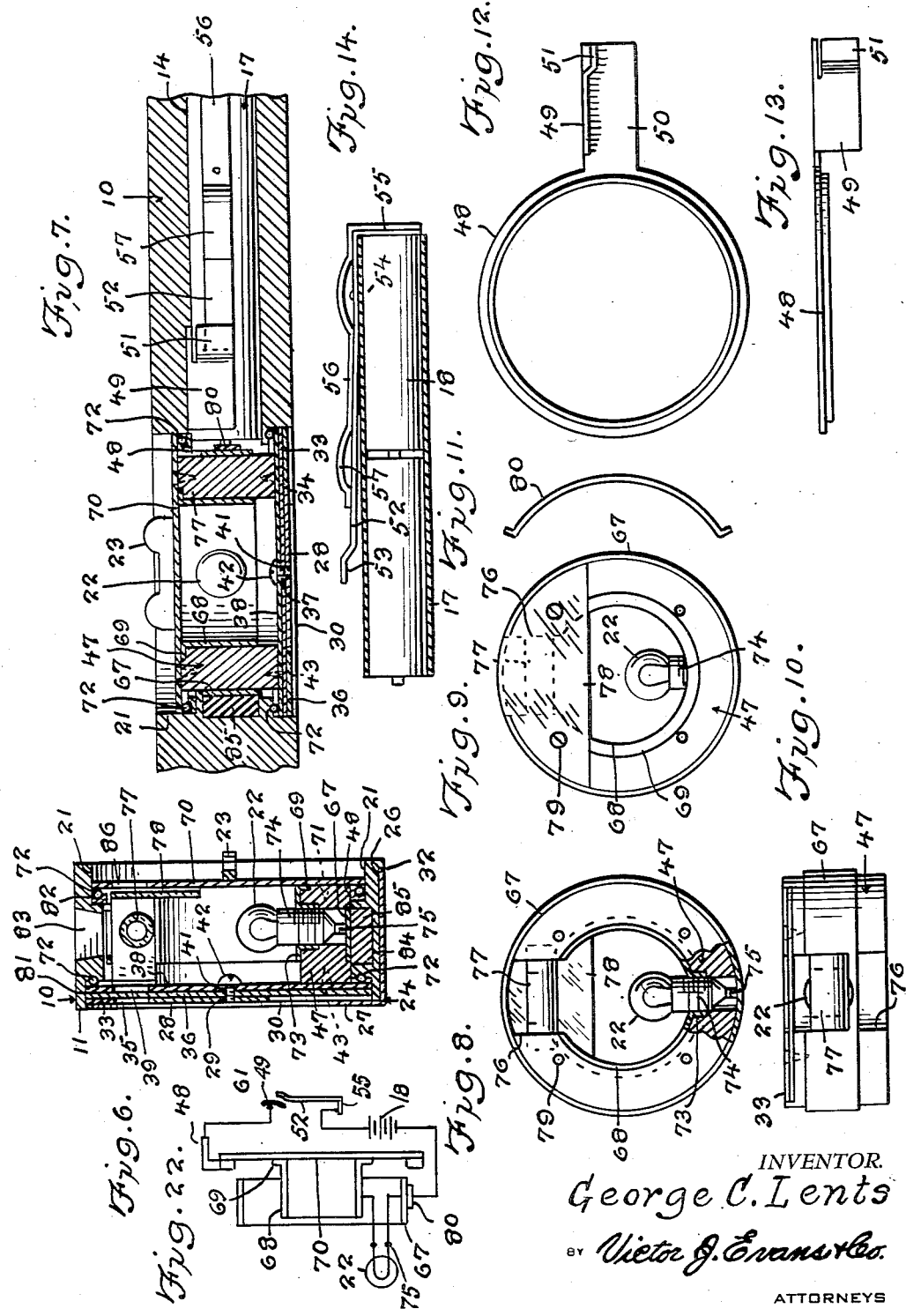
INVENTOR.
George C. Lents
BY Victor J. Evans & Co.
ATTORNEYS United States Patent Office 2,827,558
Patented Mar. 18, 1958

2,827,558

ILLUMINATED GRADUATED LEVEL

George C. Lents, Yulee, Fla.

Application December 10, 1954, Serial No. 474,443

4 Claims. (Cl. 240—6.44)

This invention relates to a tool, such as a level, and more particularly to an illuminated graduated level.

The object of the invention is to provide an illuminated graduated level which includes a manually operable illuminated dial that can be manually moved in order to permit the user to accurately ascertain the pitch of a wall or other object.

Another object of the invention is to provide an illuminated level for use by carpenters, bricklayers, or other persons wherein there is positioned within the body of the tool a battery and light bulb as well as an indicating means so that the user can adjust the level in order to determine the angular position or pitch of any object desired.

A further object of the invention is to provide an illuminated graduated level which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the level of the present invention.

Figure 2 is a fragmentary elevational view of the level showing the opposite side from Figure 1.

Figure 3 is a top plan view of the level.

Figure 4 is a longitudinal sectional view taken through the level of the present invention.

Figure 5 is an elevational view similar to Figure 2, but with parts broken away and in section showing the battery and switch mechanism.

Figure 6 is a sectional view taken on the line 6—6 of Figure 1.

Figure 7 is a sectional view taken on the line 7—7 of Figure 1.

Figure 8 is a fragmentary elevational view, with parts broken away, showing the light mounting.

Figure 9 is an elevational view showing the opposite side of Figure 8 of the light mounting.

Figure 10 is a top plan view of the assembly of Figures 8 and 9.

Figure 11 is a side elevational view of a spring member.

Figure 12 is a side elevational view of the ring member.

Figure 13 is a top plan view of the ring member of Figure 12.

Figure 14 is a longitudinal sectional view taken through the battery casing and showing the batteries in elevation.

Figure 15 is an elevational view of the bracket.

Figure 16 is a sectional view taken on the line 16—16 of Figure 15.

Figure 17 is an elevational view of the support member.

Figure 18 is an elevational view, with parts broken away, of the transparent plate.

Figure 19 is an elevational view of the graduated disc or sheet.

Figure 20 is a sectional view through the switch mechanism.

Figure 21 is a bottom plan view of the switch of Figure 20.

Figure 22 is a schematic showing of the wiring arrangement for the level of the present invention.

Referring in detail to the drawings, the numeral 10 designates the body of the level of the present invention, and the body 10 can be made of any suitable material and the body includes an enlarged portion or shoulder 11 intermediate its ends, Figure 1. The body 10 further includes a flat lower surface 12 for engagement with a wall or other object whose pitch is to be determined. There is provided in one side of the body 10 a bore or chamber 14 which is normally closed by a detachable plug 15. A coil spring 16 engages the plug 15, and the coil spring 16 abuts one end of a hollow tubular casing 17 which can be made of a suitable electrically insulating material. The casing 17 is adapted to hold a plurality of dry cell batteries 18 therein.

Extending inwardly from the opposite end of the body 10 is a second bore or chamber 19 which can be used as a storage chamber for holding spare batteries, bulbs and the like, and a plug 20 detachably closes the bore 19, Figure 4.

There is provided in the body 10 a circular cutout or opening 21, and rotatably mounted or positioned in the cutout 21 is a mounting for a light bulb 22. A manually operable knob or button 23 is provided for rotating the mounting in the opening 21 so that the angle or pitch of an object can be readily ascertained.

Referring to Figures 15 and 16 of the drawings there is shown a bracket which forms part of the present invention, and the bracket is indicated generally by the numeral 24. The bracket 24 includes a base 32 that is seated in a recess 26 in the lower surface of the body 10, Figure 4, and the base 32 can be secured to the body in any suitable manner, as for example by means of screws. Arranged at right angles with respect to the base 32 and extending therefrom is an arm 27 which has a circular head 28 secured thereto in any suitable manner, as for example by means of rivets 25. The head 28 is provided with a small central opening 29, and there is further provided in the head 28 cutout portions 30 which define a pointer 31.

When the parts are assembled a rim 33, Figure 17, is arranged contiguous to the inner surface of the arm 27, and the rim 33 is provided with a circular cutout 34 which snugly receives therein the head 28. The rim 33 is further provided with an opening 35 which defines an observation window. Arranged contiguous to the inner surface of the rim 33 is a transparent plate 36, Figure 18, and the plate 36 can be made of plastic or glass, the plate serving to help protect a graduated disc or sheet 38. The plate 36 is provided with a central opening 37, and the disc 38, Figure 19, is provided with an observation opening or window 39 as well as scale markings 40 thereon, there being a central opening 41 in the disc 38. A screw or bolt 42 extends through the registering apertures 41, 37 and 29 for maintaining the parts in their proper assembled position.

There is further provided a curved body member 47 which has a substantially cylindrical shape, and the body member 47 is movably mounted in the opening 21 in the body 10. Suitable securing elements such as screws 43 extend through registering apertures 44, 45, and 46 for maintaining the parts shown in Figures 15–19 secured to the body member 47, so that as the body member 47 is rotated by means of the knob 23, then these parts will all rotate in unison.

Referring to Figures 12 and 13 of the drawings there is shown the ring member which is indicated generally by the numeral 48. The ring member 48 includes an outstanding lug 49 which may be reinforced by means of a brace 50. The lug 49 is provided with an offset portion 51 which is adapted to be engaged by a contact portion 53 of a metal strip 52. The metal strip 52 may be secured to the casing 17 by a suitable securing element such as a rivet 54, Figure 14, and extending along the outer surface of the strip 52 and secured thereto is a strap 56. The strap 56 includes an enlarged or curved portion 57, and end portions of the strip 52 and strap 56 are designated by the numeral 55, and these end portions 55 contact the end of one of the batteries 18.

The manually operable switch mechanism for controlling energization of the light bulb 22 is shown in detail in Figures 20 and 21, and the switch mechanism includes a curved plate 59 which is seated in a recess 58 in the upper portion of the body 10. The plate 59 is provided with a slot 60, and a manually operable button or knob 61 is slidably positioned in the slot 60. The button 61 carries a pin 62 that engages a pair of spaced parallel spring fingers 63. The spring fingers 63 may be secured to the plate 59 by suitable securing elements 64, and each of the spring fingers 63 are provided with a pair of sockets or recesses 65 and 66 for receiving the pin 62 so as to maintain the pin 62 and button 61 immobile in their adjusted positions. The plate 59 may be secured to the body by suitable securing elements 68' which extend through apertures 67' in the plate.

Surrounding the body member 47 and secured thereto is an annular rim 67, and arranged contiguous to the inner surface of the body member 47 and secured thereto is a bracket 68, the members 67 and 68 both being made of a suitable conductive material such as metal. The bracket 68 includes an outer flange 69 which abuts a metal disc 70, and the disc 70 may be secured to the body member 47 by securing elements 71, Figure 6. Suitable ball bearings 72 may be provided between the moving parts so as to insure that the parts move easily and with a minimum of effort. The bracket 68 is shaped to define a socket 73 which receives the usual metal base 74 of the light bulb 22. A contact 75 connects an end of the bulb 22 to the rim 67.

A portion of the body member 47 is cutaway as at 76, Figures 8 and 9, and a fluid holding tube or bead 77 extends across the cutaway portion 76 and has its ends secured to the body member 47. The bead 77 may have the usual bubble therein. A shield 78 of transparent material may be secured to the body member 47 by suitable securing elements 79, and the transparent shield 78 helps to protect the bead 77.

A spring-like arcuate spacer member 80 is arranged in engagement with the rim 67 so as to prevent accidental rotation of the body member 47 and its associated parts, the spacer member 80 being shown in Figure 11. The knob 23 which is used for turning the body member 47, is secured to the disc 70. The body 10 may be provided with circular indentations or shoulders which are defined by annular cutouts 81 and 82, Figure 6. An opening 83 in the top of the body 10 defines an observation window for at times viewing the bead 77.

An annular insert 85 of a suitable material such as rubber is seated in a recess 84, and the rubber insert 85 frictionally engages the rim 67 so as to prevent accidental movement of the light mounting.

From the foregoing it is apparent that there has been provided an illuminated graduated level which can be used for determining the exact angle or pitch of an object such as a wall. In use the switch button 61 can be moved in the slot 60 until the inner portion of button 61 engages the curved portion 57 of the strap 56 whereby the contact 53 will be moved into engagement with the offset portion 51 of the lug 49. Then, the electrical circuit to the light bulb 22 will be completed. Thus, referring to Figure 22, it will be seen that the circuit is completed from the batteries 18 through the contact portion 55, then through the strip 52, lug 49, then through the metal ring member 48 of Figure 12, then to the disc 70, and the electrical energy then passes through the flange 69 and through the bracket 68 and through the light bulb 22 to the contact 75, then to the outer rim 67 and through the metal member 80 and then to the end of the adjacent battery 18. Thus, the bead 77 will be illuminated by the bulb 22 so that the user can readily observe the bead 77 which has the air bubble therein, either through the observation window 83 in the top of the body, or else the bead can be observed through the aperture 86 in the disc 70. Or, if the viewer is observing the bead from the opposite side of the instrument, then the bead can be observed through the window opening 35. The lower flat surface 12 of the body 10 engages the wall or article whose pitch is to be determined, and when the bubble is in the center of the bead or tube 77, and after the knob 23 has been manually grasped. In other words, the lower surface 12 is first arranged in engagement with the wall and then the knob 23 is rotated until the air bubble in the bead or tube 77 is in the center of the bead. When the air bubble is in this center most position, the reading given by the pointer 31 on the scale 40 is noted and this will be the angle or pitch of the wall. While these readings are being taken, the light bulb 22 remains actuated since the button 61 is held immobile in its various adjusted positions by means of the pin 62 seating in the recesses 66 or 65. When the instrument is not being used, the light bulb 22 can be de-energized by means of the switch button 61 so that the batteries will not be worn out or down needlessly. The construction of the apparatus is such that there will always be an electrical circuit capable of energizing the bulb 22 regardless of the position of the bead 77 so that the level can be readily read even in dark places.

The body 10 is made of a suitable electrically insulating material and so is the casing 17. The body member 47 is also of insulating or non-conductive material, while the parts which conduct the electrical current from the batteries to the bulb are of metal. The transparent plate 36 as well as the shield 78 help to protect the parts from dust or other foreign matter. Any suitable scale 40 can be arranged on the member 38. It is to be understood that minor changes in construction of the device can be made insofar as they are consistent with the spirit of the invention. With the present invention the workmen can ascertain or observe the exact degree of the pitch.

I claim:

1. In an illuminated graduated level, a body provided with a flat lower surface, a bore in said body extending inwardly from one end thereof, an insulated casing snugly seated in said bore, a metal strip extending along the outer surface of said casing and secured thereto, a plurality of batteries connected in series and positioned in said casing in end to end relation with respect to each other and with one terminal of the batteries in contact with said metal strip, a coil spring positioned in said bore and arranged contiguous at one end to an end of said casing, a detachable plug for closing the outer end of said bore arranged contiguous with the opposite end of said spring, said plug tensioning said spring to urge said casing inwardly of said bore, said body having a recess communicating with the bore in said body, a manually operable button slidably mounted in the recess, an aperture extending downwardly from the top of said body defining an observation window, a circular opening arranged in said body intermediate the ends thereof, an insulated body member of substantially cylindrical shape rotatably arranged in said circular opening, a circular disc secured to one side of said insulated body member, and being of greater diameter than said insulated body member, said insulated body member being provided with a cutout therein, a tubular bead having a bubble therein extending through said cutout and connected at its opposite ends to said insulated body member, said disc having an aperture therein for permitting observation of said bead, an annular bracket of metal electrically connected to said disc and secured to the inner surface of said insulated body member and provided with a socket, a light bulb having a portion thereof arranged in engagement with said socket, a metal rim arranged around the outer surface of said insulated body member and secured thereto so that one terminal of said light bulb is electrically connected to said metal rim, a support member secured to the opposite side of said insulated body member from said disc, and said support member being provided with a central cutaway portion and an observation window for observing said bead, a transparent plate arranged contiguous to the inner surface of said support member, a graduated gauge sheet interposed between said transparent plate and the adjacent surface of said insulated body member, a bracket including a base secured to the lower surface of said body, an arm arranged at right angles with respect to said base, a head secured to said arm and provided with a pointer for coaction with said graduated gauge sheet, a metal ring member electrically connected to said disc and said ring member including an L-shaped lug that is positioned below one end of said strip, one end of said strip engaging the end of one of said batteries so that when said button is operated to close said switch it will depress the end of said strip into engagement with said L-shaped lug to close the light circuit, and an arcuate spacer member arranged in engagement with said rim and electrically connected to said batteries.

2. The structure as defined in claim 1, wherein said body is provided with an annular recess that is in communication with the cutout in said body, and a resilient insert seated in said last named cutout for frictionally engaging said rim.

3. The structure as defined in claim 1, and further including a manually operable knob extending outwardly from said disc and secured thereto.

4. The structure as defined in claim 1, and further including ball bearings arranged adjacent the rotary body member to insure friction free movement between said body and said rotary body member.

References Cited in the file of this patent

UNITED STATES PATENTS

| | | |
|---|---|---|
| 1,036,601 | Frank | Aug. 27, 1912 |
| 1,172,971 | Frank | Feb. 22, 1916 |
| 1,400,069 | Hunter | Dec. 13, 1921 |
| 1,915,596 | Dyer | June 27, 1933 |